United States Patent [19]

Carlson, Jr.

[11] 4,056,011

[45] Nov. 1, 1977

[54] SCOTCH YOKE

[75] Inventor: William L. Carlson, Jr., St. Cloud, Minn.

[73] Assignee: General Signal Corporation, Rochester, N.Y.

[21] Appl. No.: 695,891

[22] Filed: June 14, 1976

Related U.S. Application Data

[60] Continuation of Ser. No. 530,639, Dec. 9, 1974, which is a division of Ser. No. 385,379, Aug. 3, 1973, abandoned.

[51] Int. Cl.² .............................................. F16H 21/15
[52] U.S. Cl. ...................................................... 74/50
[58] Field of Search ....................... 74/50, 89.15, 424.8; 251/228, 229

[56] References Cited

U.S. PATENT DOCUMENTS

| | | | |
|---|---|---|---|
| 3,385,120 | 5/1968 | Nott | 74/89.15 |
| 3,575,378 | 4/1971 | Fawkes | 74/89.15 |
| 3,677,108 | 7/1972 | Prikkyl et al. | 251/229 |

FOREIGN PATENT DOCUMENTS

| | | | |
|---|---|---|---|
| 776,033 | 1/1968 | Canada | 251/229 |

*Primary Examiner*—Samuel Scott
*Assistant Examiner*—Wesley S. Ratliff, Jr.
*Attorney, Agent, or Firm*—Jeffrey S. Mednick

[57] ABSTRACT

An improved scotch yoke has a means for absorbing sideward thrust. It includes a rod extending in a first direction through a hole in the yoke housing. A yoke arm in the housing is pivotable about an axis and extends in a second direction that intersects the first direction. Projection means, preferably on a member on the rod, extend through a slot in the yoke arm to link the rod with a means for absorbing sideward thrust to minimize bowing and twisting in the yoke arm and the rod. Movement of the rod slides the member in the first direction and pivots the yoke arm about the axis.

5 Claims, 7 Drawing Figures

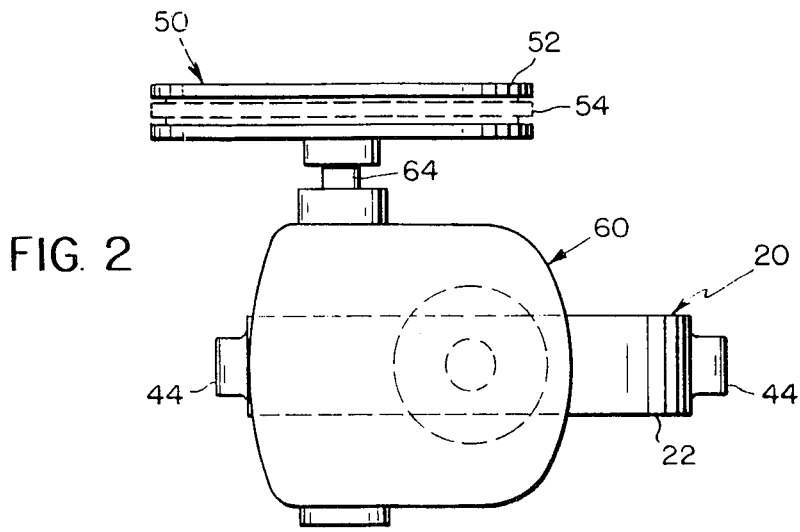
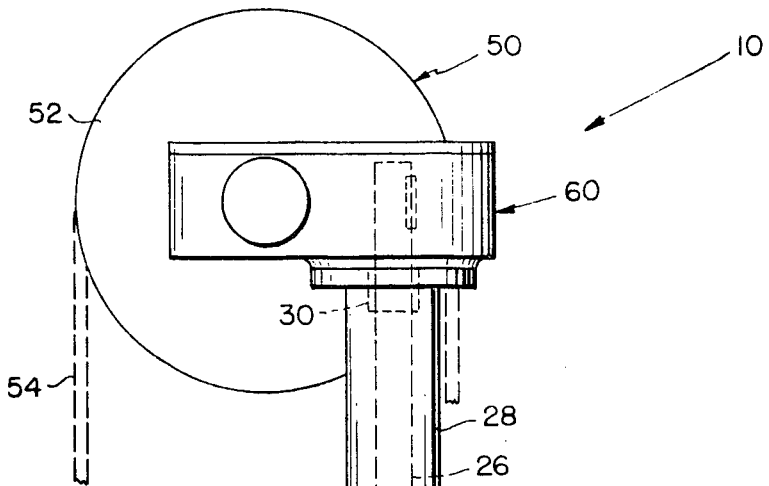

FIG. 3

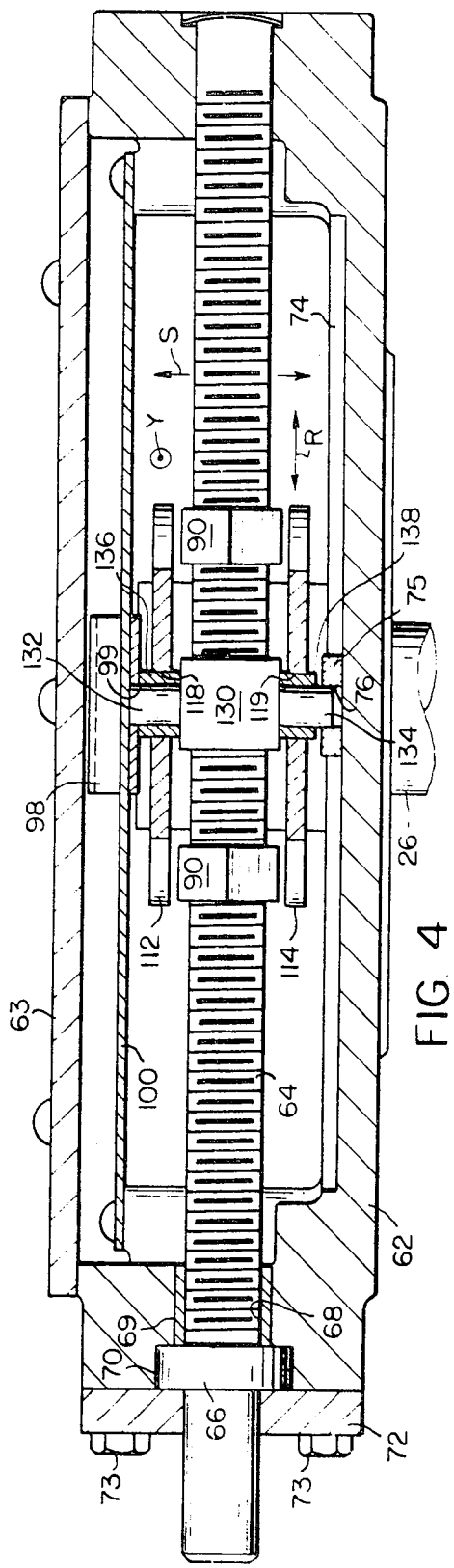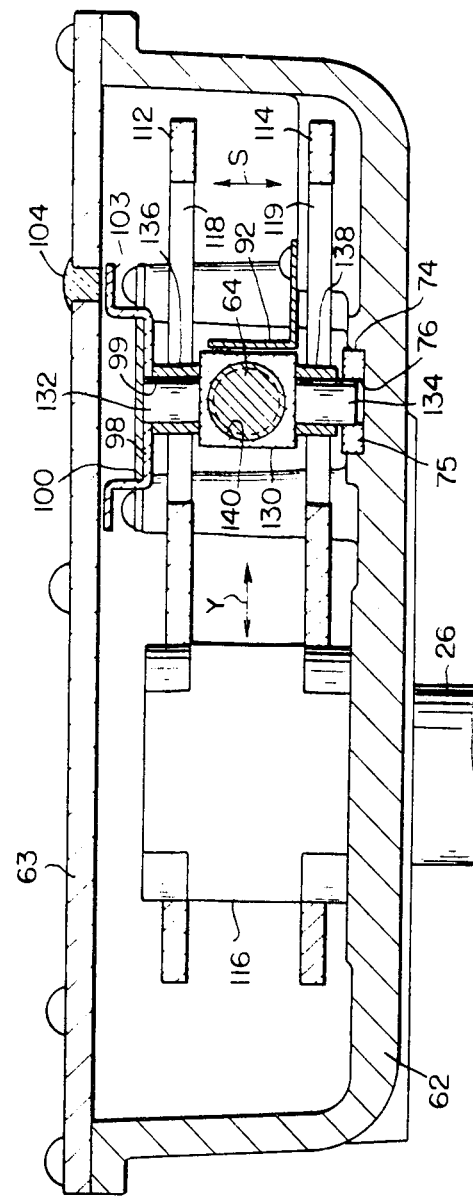

SCOTCH YOKE

CROSS-REFERENCE TO RELATED APPLICATION

This is a continuation of U.S. Application Ser. No. 530,639, filed Dec. 9, 1974, which is a division of U.S. Application Ser. No. 385,379, filed Aug. 3, 1973, and now abandoned.

BACKGROUND OF THE INVENTION

1. Field of Use

While the scotch yoke is subject to a wide range of applications, it is especially suited for use in a valve, such as a butterfly valve, and will be particularly described in that connection.

2. Description of the Prior Art

Scotch yokes have been used for many years in a wide variety of uses. They may be actuated either manually or automatically. When a load is placed on the input rod of the scotch yoke by an actuator, sideward thrust causes the input rod and yoke arm to bow and twist. This increases the friction on the sliding nut. At the extreme positions of travel of the sliding nut, the bowing and twisting become severe and the yoke arm tends to bind. This makes it difficult, if not imposible, to operate the scotch yoke manually. In addition, the plates of the yoke arm tend to separate and the yoke hub sometimes breaks.

In the past, it has been suggested to beef-up the yoke hub. This solution was satisfactory in the sense that it prevented the hub from breaking, but it did not eliminate the stresses which caused bowing and twisting. Therefore, manual operation of the yoke could still be extremely difficult.

It is an object of the present invention to provide a scotch yoke that is relatively inexpensive to manufacture.

It is a further object of the present invention to provide a scotch yoke that is relatively simple to manufacture.

It is a further object of the present invention to provide a scotch yoke that is very durable.

It is a further object of the present invention to provide a scotch yoke that is relatively easy to use.

It is a further object of the present invention to provide a scotch yoke having minimal sideward stress in the critical input members and minimal twisting stresses in the yoke assembly.

It is a further object of the present invention to provide a valve with a scotch yoke as mentioned herein.

SUMMARY OF THE INVENTION

In accordance with the present invention, a scotch yoke is disclosed for performing all of the objects set forth hereinabove. The scotch yoke comprises a housing having a hole therethrough. A rod extends through the hole in a first direction. A yoke arm in the housing is pivotable about an axis and extends in a second direction that intersects the first direction. A projection, preferably on a member on the rod, extends through a slot in the yoke arm to link the rod with a means for absorbing sideward thrust to minimize bowing and twisting in the yoke arm and said rod. In a first embodiment, the rod is threaded and means are provided for preventing the rod from moving in the first direction. The member has a threaded hole through which the rod extends. Means are provided for preventing the member from rotating about the first direction. Rotation of the rod slides the member in the first direction and pivots the yoke arm about the axis.

In a second embodiment, the member is rigidly connected to the rod and the rod is free to move in the first direction, whereby movement of the rod in the first direction pivots the yoke arm about the axis.

Further, in accordance with the present invention, a valve comprising a scotch yoke, a valve body and actuator means are disclosed. The scotch yoke comprises a housing having a hole therethrough. A rod extends through the hole in a first direction. A yoke arm in the housing is pivotable about an axis and extends in a second direction that intersects the first direction. A member on the rod has a projection that extends through a slot in the yoke arm. The projection links the member with a means for absorbing sideward thrust to minimize bowing and twisting in the yoke arm and the rod.

The valve body comprises a passage for fluid flow, a closure means for controlling flow therethrough and a shaft extending along the shaft axis and connected to the closure means.

The actuator means moves the rod to rotate the yoke arm and therefore the closure means.

For a better understanding of the present invention, together with other and further objects thereof, reference is made to the following description, taken in connection with the accompanying drawings, while its scope will be pointed out in the appended claims.

BRIEF DESCRIPTION OF THE DRAWINGS

FIG. 1 is a schematic front view illustrating a butterfly valve in accordance with a first embodiment of the present invention;

FIG. 2 is a top view of the butterfly valve of FIG. 1;

FIG. 3 is a view, partly in section, of a scotch yoke made in accordance with the first embodiment of the present invention;

FIG. 4 is a cross-sectional view of the scotch yoke of the present invention taken along lines 4—4 of FIG. 3;

FIG. 5 is a view that is a cross-sectional view of the scotch yoke of the present invention taken along lines 5—5 of FIG. 3;

DESCRIPTION OF THE PREFERRED EMBODIMENT

Figure 6:
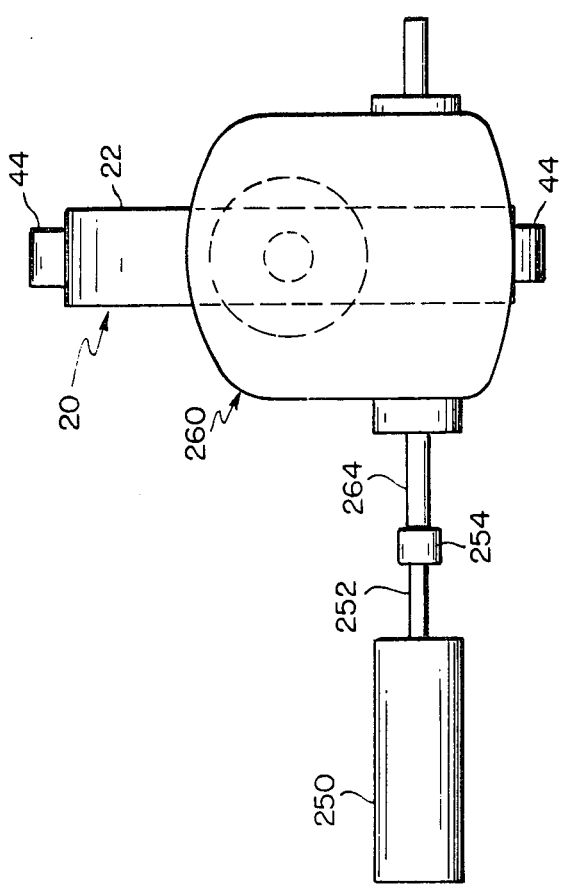
FIG. 6 is a top view of a butterfly valve in accordance with a second embodiment of the present invention.

In accordance with the first embodiment of the present invention, a valve assembly 10 comprises a valve 20, an actuator means 50 and a scotch yoke 60. Valve 20, may be a butterfly valve, such as the one described in U.S. Pat. No. 3,517,689 to Willian N. Roos.

The valve may comprise a valve body 22 having a passage 24 for fluid flow therethrough. A closure means, such as a solid disc 38, controls flow through the valve body. Corrosion resistant bearings 30 and 32 and shaft seals (not illustrated) customarily surround a solid, one-piece shaft or stem 26 in neck 28.

Valve 20 is shown in a closed position in FIG. 1 with disc 38 engaging a resilient seat 40. A seat retaining ring 42 may be used to hold seat 40 in place. Any suitable mounting means may be used for the valve, but FIG. 1 illustrates lug bodies 44 for mounting valve 20 in a pipeline.

In order to open and close valve 20, actuator means 50 are provided. Any suitable actuator may be used, but FIGS. 1 and 2 illustrate a chain 54 encircling a chainwheel 52. This type of actuator is often used to provide manual valve operation of valves installed overhead. Chainwheel 52 is mounted on a threaded input rod 64 such that rotation of chainwheel 52 also rotates input rod 64. As will be described in detail hereinbelow, in the first embodiment, it is the rotation of this input rod 64 which causes a yoke arm in the scotch yoke to pivot about an axis and open and close the valve.

Figure 3:
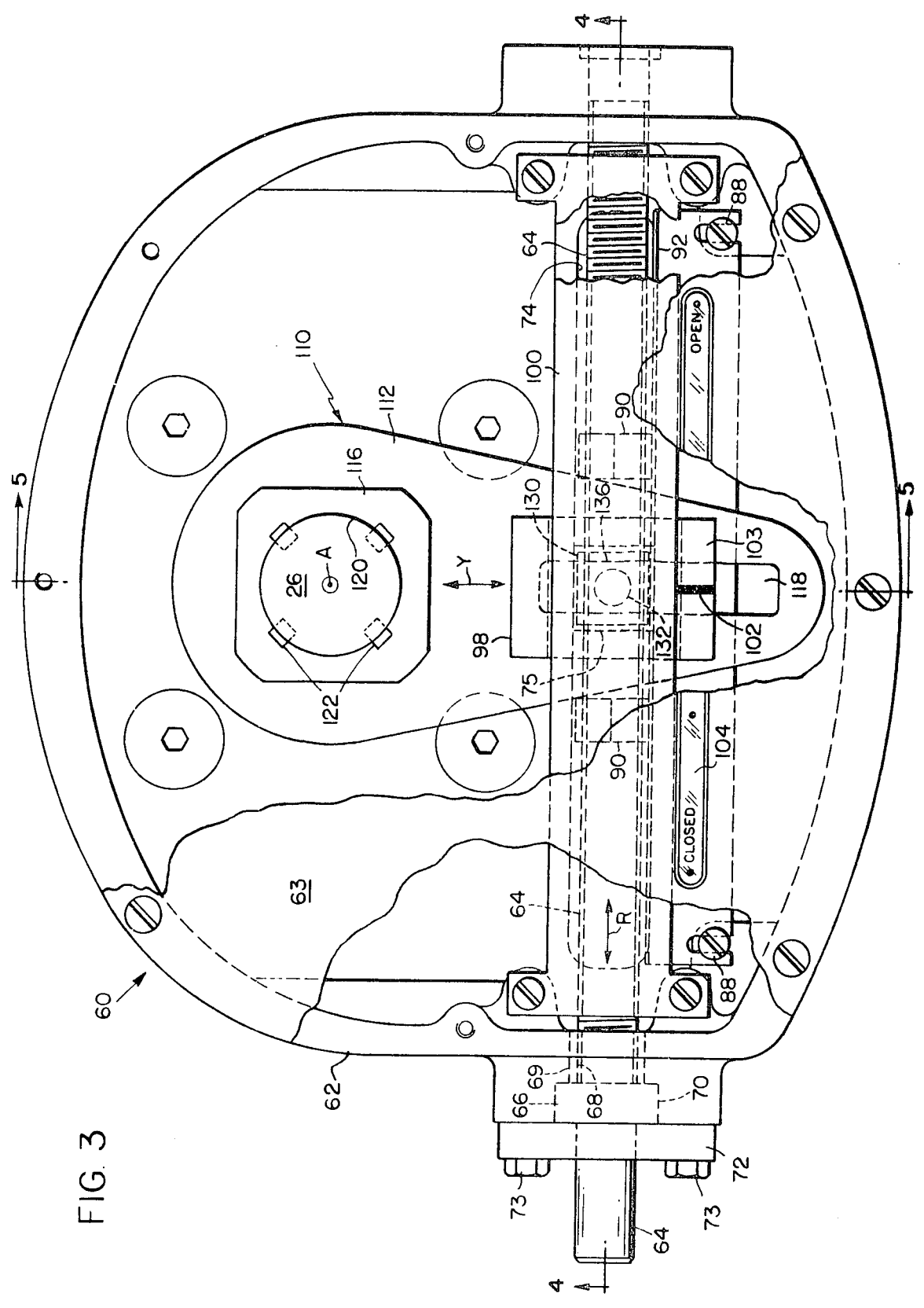

Referring to FIGS. 3, 4 and 5, a scotch yoke 60 made in accordance with the first embodiment of the present invention will be better understood. Threaded input rod 64 extends in a first direction R through a hole 68 in housing 62 of scotch yoke 60. Input rod 64 may be of any strong, rigid material, such as steel. A shoulder 66 on rod 64 is positioned in an enlarged bore 70 with a large clearance. Cover plate 72 is positioned over enlarged bore 70 and fastened in place by any suitable means such as bolts 73. Shoulder 66 in bore 70 prevents input rod 64 from moving in direction R.

Also positioned in housing 62 is a yoke arm 110 extending in a second direction Y and preferably constructed of yoke arm plates 112 and 114 connected by a yoke hub 116. Plates 112 and 114 and hub 116 are constructed of a high strength steel. Forgings are not required since stresses are reduced. Yoke arm plates 112 and 114 have slots 118 and 119, respectively, extending therethrough. A hole 120 extends through yoke hub 116. In operation, the valve shaft or stem 26 extends into hole 120 and is keyed by any suitable means, such as keys and keyways at 122. It can be seen that rotation of yoke arm 110 about the axis A of the valve shaft or stem 26 opens or closes valve 20.

A member 130, often referred to as a traveling nut, is positioned between yoke arm plates 112 and 114. Member 130 has projections 132 and 134 that extend through bushings 136 and 138, positioned in slots 118 and 119. Member 130 is preferably made of steel and bushings 136 and 138 are preferably made of a bearing material that will withstand a substantial load, such as bearing brass. In accordance with the present invention, projections 132 and 134 extend beyond bushings 136 and 138, respectively, for purposes to be described hereinbelow.

A threaded hole 140 extends through member 130. This hole is compatible with theaded input rod 64 which extends therethrough. Projections 132 and 134 in slots 118 and 119, and holes 76 and 99, respectively, prevents member 130 from rotating about first direction R. Therefore, as input rod 64 is rotated, member 130 travels in first direction R causing yoke arm 110 to pivot about the axis A of the valve shaft or stem 26.

As pointed out hereinabove, prior scotch yokes were limited in the sense that it was often difficult to rotate the input rod due to binding of the yoke arm. This binding was caused by bowing and twisting of the yoke arm and the input rod. FIG. 3 shows yoke arm 110 in a dead center position, but at the end positions, i.e. when the valve approaches a full open or full closed position, the binding is severe. This is true even through the input rod is supported at its ends. An analysis of the internal stresses and moments of the components reveals that the sideward stresses or thrust are greatest as the yoke arm approaches its extreme positions. As pointed out above, beefing-up the hub may prevent its cracking, but severe effort is still required to rotate the input rod. This makes it very difficult, if not impossible, to make fine adjustments manually.

In accordance with the present invention, member 130 links rod 64 with a means for absorbing sideward thrust to minimize bowing and twisting of the yoke arm and the input rod. Extending in direction R in the bottom wall of housing 62 is a slot 74. Located in slot 74 is a sliding thrust absorber 75. Thrust absorber 75 contains a projection hole 76 and may be made of any highly stressed bearing material such as bronze or steel. Projection 134, described hereinabove in connection with member 130, extends into hole 76. As member 130 travels in direction R, projection 134 moves sliding thrust absorber 75 in slot 74. This absorbs sideward thrust in yoke arm plates 112 in a direction S and in rod 64 in direction Y to minimize bowing and twisting of the yoke arm and the input rod. It should be understood that an identical means could be used on the other side of the input rod 64 and the yoke arm 110. However, since the top portion 63 of the housing 62 is removable, it may be difficult to align projection 132 with a slot in top portion 63 when assembling scotch yoke 60. Therefore, an alternative embodiment is preferred.

As clearly illustrated in FIGS. 3, 4, and 5, a guide strap 100 is mounted, such as with bolts, in housing 62 above yoke arm 110. Guide strap 100 is made of a suitable material, such as cast iron or cold rolled steel. A thrust absorbing saddle 98, preferably a cold rolled steel stamping, has a projection hole 99 and is free to slide in direction R along guide strap 100. Projection 132 extends into hole 99. Therefore, as member 130 travels along input rod 64, saddle 98 slides along guide strap 100. This alternative apparatus also absorbe sideward stresses to minimize bowing and twisting of the yoke arm 110 and the rod 64. It may also be used adjacent the bottom wall of housing 62.

Stop nuts 90, as best seen in FIG. 4, are mounted on threaded input rod 64. L-shaped guide strap 92, preferably made of cold rolled steel and mounted in the housing, such as with screws 88, prevents stop nuts 90 from rotating. These nuts function as a stop guide and are usually set to prohibit movement of member 130 beyond the full open or full closed position of the valve.

In operation, any suitable rotary actuator means, manual or automatic, such as the chain and chainwheel illustrated, rotates threaded rod 64. This rotation causes member 130 to travel in direction R. Since member 130 has projections 132 and 134 extending into slots 118 and 119, respectively, movement of member 130 in direction R causes yoke arm 110 to pivot about the axis A of the vlave shaft or stem 26. This also rotates the valve stem 26 and the closure means such as a butterfly disc 38, to open and/or close the valve. It is customary for a clockwise rotation to close the valve and a counter-clockwise rotation to open the valve. Marking 102 in flange portion 103 of saddle 98 may be seen through window 102 in top portion 63 of housing 62 to indicate the position of the closure means 38. Projections 132 and 134 extend above and below the yoke arm plates and link the yoke arm with means for absorbing sideward thrust to minimize bowing and twisting of the yoke arm and input rod. This means may be either of the embodiments described or a combination of both (as illustrated) or two or more of each.

Figure 7:
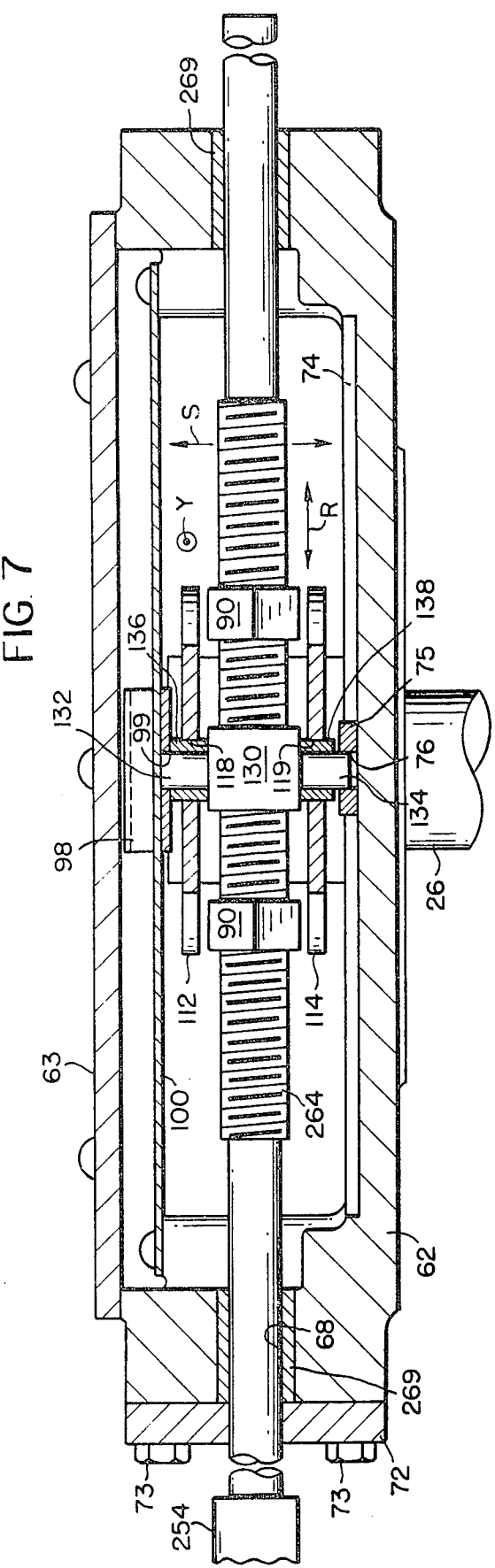
FIG. 7 is a cross-sectional view of a scotch yoke made in accordance with the second embodiment of the present invention.

Referring to FIGS. 6 and 7, there is shown a second embodiment of the present invention. For the most part, the second embodiment is the same as the first embodiment and like elements therefore receive like reference numerals.

FIG. 6 shows a linear actuator 250 having a piston rod 252 connected by coupling 254 to the input rod 264 of scotch yoke 260. FIG. 7 is a cross-section of the second embodiment of the present invention. Rod 264 is mounted in bearings 269 s that rod 264 may reciprocate in the first direction R. Member 130 is rigidly connected to rod 264 in the sense that member 130 reciprocates with rod 264. Rod 264 is shown as being threaded so that member 130 and stop nuts 90 may be positioned on rod 264, but other mounting means for member 130 and stop nuts 90 will be apparent to one skilled in the art.

The operation of this second embodiment is identical to the operation of the first embodiment except that in the second embodiment the input rod 264 reciprocates (rather than rotates) to pivot the yoke arm 110 about axis A. Any suitable linear activating means, manual or automatic, may be used to reciprocate rod 264.

It should also be understood that while the member 130 has been illustrated with projections 132 and 134 extending into projection holes 99 and 76, respectively, it would be a mere reversal of parts to place the projections on thrust absorber 75 and saddle 98 so that they extend into holes in member 130. Further, other suitable linking means may also be used.

One skilled in the art will realize that there has been disclosed a valve including a scotch yoke that is easy to manufacture and use.

While there has been described what is at present considered to be the preferred embodiment of the invention, it will be obvious to those skilled in the art the various changes and modifications may be made therein without departing from the invention, and it is, therefore, aimed in the appended claims to cover all such changes and modifications as fall within the true spirit and scope of the invention.

What is claimed is:

1. In a scotch yoke comprising a housing with a hole therethrough, a threaded rod extending along an axis through said hole in a first direction, means for preventing said rod from moving in said first direction, a yoke arm in said housing pivotable about an axis and extending in a second direction that intersects said first direction, slot means in said yoke arm, the improvement comprising:
   a member on said rod and threadingly engaged therewith, said member having projection means extending through said slot means, and a means cooperating with said projection means for absorbing thrust in a sideward direction on said yoke arm and in a sideward direction on said rod, said means for absorbing thrust being positioned in a plane which includes said axis of said rod and is perpendicular to said sideward direction of said rod to thereby minimize bowing and twisting in said yoke arm and said rod, said means for absorbing sideward thrust to minimize bowing and twisting comprises a guide strap fixed to said housing and a saddle slidably mounted on said guide strap, said guide strap extending in said first direction, said projection means fitting into a hole in said saddle to link said saddle member to said yoke arm, whereby rotation of said rod slides said member in said first direction and pivots said yoke arm about said axis.

2. A scotch yoke as defined in claim 1, wherein said yoke arm comprises two arm plates and a hub containing said plates.

3. A scotch yoke as defined in claim 2, wherein each of said arm plates has a slot means therein, said member having two projection means, one extending through each slot means and linking said yoke arm with two separate means for absorbing sideward thrust to minimize bowing and twisting in said yoke arm and said rod.

4. A scotch yoke as defined in claim 3, wherein said member is rigidly connected to said rod and said rod is free to travel in said first direction, whereby movement of said rod in said first direction pivots said yoke arm about said axis.

5. A scotch yoke as defined in claim 4, wherein said means for absorbing sideward thrust to minimize bowing and twisting further comprises channel means extending in said first direction in said housing with a thrust absorber slidably mounted in said channel means, said yoke arm being between said channel and said strap, said projection means fitting into holes in said thrust absorber and said saddle to link said thrust absorber and said saddle to said yoke arm.

* * * * *